United States Patent
Deng

(10) Patent No.: US 9,710,256 B2
(45) Date of Patent: Jul. 18, 2017

(54) SOFTWARE UPGRADE METHOD AND SYSTEM FOR MOBILE TERMINAL

(71) Applicant: HUIZHOU TCL MOBILE COMMUNICATION CO., LTD., Huizhou (CN)

(72) Inventor: Tiejun Deng, Huizhou (CN)

(73) Assignee: HUIZHOU TCL MOBILE COMMUNICATION CO., LTD., Huizhou (CN)

( * ) Notice: Subject to any disclaimer, the term of this patent is extended or adjusted under 35 U.S.C. 154(b) by 116 days.

(21) Appl. No.: 14/439,185

(22) PCT Filed: Apr. 18, 2014

(86) PCT No.: PCT/CN2014/075652
§ 371 (c)(1),
(2) Date: Apr. 28, 2015

(87) PCT Pub. No.: WO2015/035777
PCT Pub. Date: Mar. 19, 2015

(65) Prior Publication Data
US 2015/0277897 A1     Oct. 1, 2015

(30) Foreign Application Priority Data
Sep. 13, 2013 (CN) .......................... 2013 1 0417037

(51) Int. Cl.
*G06F 9/44* (2006.01)
*G06F 9/445* (2006.01)
(Continued)

(52) U.S. Cl.
CPC ............... *G06F 8/68* (2013.01); *G06F 8/665* (2013.01); *H04W 8/22* (2013.01); *H04W 8/245* (2013.01)

(58) Field of Classification Search
None
See application file for complete search history.

(56) References Cited

U.S. PATENT DOCUMENTS

| 8,225,134 B2 | 7/2012 | Desai et al. | |
| 8,612,967 B1 * | 12/2013 | Delker | G06F 8/61 717/169 |
| 2006/0075284 A1 * | 4/2006 | Skan | G06F 8/63 714/5.1 |

FOREIGN PATENT DOCUMENTS

| CN | 101923473 A | 12/2010 |
| CN | 102207878 A | 10/2011 |

(Continued)

*Primary Examiner* — Qamrun Nahar
(74) *Attorney, Agent, or Firm* — Shimokaji IP

(57) ABSTRACT

A software upgrade method and system for a mobile terminal includes locating partition tables of a new version of software and an old version of software, generating a corresponding backup list, scanning all files of the new version of software, generating a differential upgrade package that comprises a partition table of the new version of software and the backup list, saving backup data, to be backed up in the mobile terminal, into a SD card according to the backup list, re-partitioning a mobile terminal memory according to the partition table of the new version of software in the differential upgrade package, correspondingly writing the backup data on the SD card into the partition, decompressing the differential upgrade package to obtain a corresponding differentiating file, generating corresponding new version files according to the differentiating file and the old version files in the mobile terminal, and writing into the mobile terminal.

20 Claims, 6 Drawing Sheets

(51) Int. Cl.
*H04W 8/22* (2009.01)
*H04W 8/24* (2009.01)

(56) References Cited

FOREIGN PATENT DOCUMENTS

| | | |
|---|---|---|
| CN | 102693135 A | 9/2012 |
| CN | 103176824 A | 6/2013 |
| CN | 103473099 A | 12/2013 |

\* cited by examiner

SOFTWARE UPGRADE METHOD AND SYSTEM FOR MOBILE TERMINAL

TECHNICAL FIELD

The present disclosure generally relates to the field of mobile terminals. In particular, the disclosure relates to a software upgrade method and system for a mobile terminal.

BACKGROUND

Existing smartphones, such as a cell phone with an Android system, often need to upgrade software. Generally, a FOTA (Firmware Over-The-Air) upgrade is used. The FOTA upgrade is a simple and friendly upgrade method, which can upgrade the cell phone software to the latest version almost without asking a user to carry out any operation. Given the current tendency that the development of smartphones is fast, however, there are often situations in which a memory partition table of a cell phone needs to be revised due to the software version upgrade (or changes to software requirements). The existing FOTA mechanism is unable to handle this type of situations.

Specifically in the field of mobile terminals and the entire embedded field, with a cell phone as an example, there are typically two types of storage media, one type of storage media is cell phone memory, which is typically a NAND or EMMC and is a core storage space for the cell phone. The second type of storage media is expanded memory, which is typically a SD card.

There are two types of cell phone memory partitions (the term "partition" as used hereinafter refers in particular to a cell phone memory partition, and the term "partition table" refers in particular to a partition table of a cell phone memory). One type of cell phone memory partition is a raw data type, i.e. writing and reading data in a form of a raw data stream, and this type of partition includes bootloader, kernel, etc. The other type of cell phone memory partition is a filesystem type. The term "file" herein means computer file, which refers to a set of some data. One file represents a set of data. In this type of partition, a file system (e.g. EXT4 or FAT) is deployed to manage all files. If a file needs to be read or written, a reading or writing mode of the file system is written. On a typical cell phone apparatus, both a system partition and a userdata partition belong to this type. Figuratively, the filesystem type partition is like a book having a table of contents. The table of contents is META data in the partition regarding a file list, file attributes, and a file size.

On the other hand, the raw data type partition is like a book without a table of contents. According to the actual situation of a cell phone (embedded) field, it can be simply summarized that the raw data type partition may store one file, and the filesystem type partition may store multiple files. As described above, each partition has a conventional type, and therefore, the partition type will usually not change.

Given that development of smartphones is fast, however, there are often situations in which a memory partition table of a cell phone needs to be revised due to a software version upgrade (or changes to software requirements). Changes to a partition table include changes to a starting address and changes to a size of the associated partitions. Such changes to the starting address and to the size of the partitions are fatal to a filesystem type partition, as this type of change may corrupt META data. Once the META data is corrupted, some files in the partition cannot be read or written. Although a raw data type partition does not have META data, this type of change may still corrupt data in the partition.

Moreover, the FOTA mechanism is based on a file differential algorithm and all of its operations are file operations. In the event that files are corrupted, the FOTA operations will certainly fail. Furthermore, the existing FOTA mechanism does not provide relevant measures for "changes to a partition table of a memory between new and old versions of the software". As a result, the existing FOTA mechanism is unable to process this type of situations. Since the existing FOTA upgrade method cannot handle this type of situations, it will make the development more difficult if the original partition table has to be kept, and moreover, users will not be able to have the latest and the best user experience.

Therefore, the prior art still needs to be improved and developed.

SUMMARY

The technical problems that the present invention solves are associated with providing software upgrades.

A software upgrade method for a mobile terminal includes according to a new version of software and an old version software, locating partition tables of the new version of software and the old version of software, respectively, comparing a difference between new and old partition tables, and generating a corresponding backup list; scanning all files of the new version of software and generating a differential upgrade package that comprises a partition table, of said new version software, and a backup list; according to the backup list in said differential upgrade package, detecting a total size of backup data to be backed up in the mobile terminal, and comparing said total size of the backup data with a remaining space of a SD card of the mobile terminal, and when said total size of the backup data is smaller than the remaining space of the SD card of the mobile terminal saving the backup data into the SD card according to said backup list, re-partitioning a mobile terminal memory according to said partition table of the new version of software in said differential upgrade package, detecting a partition type, and correspondingly writing the backup data on the SD card into the partition; and decompressing said differential upgrade package to obtain a corresponding differentiating file, generating corresponding new version files according to said differentiating file and old version files in the mobile terminal, and writing the new version files into the mobile terminal.

In another embodiment, a software upgrade method for a mobile terminal includes according to a new version of software and an old version of software, acquiring partition tables of the new version of software and the old version of software, respectively; traversing a partition table of the new version of software, if traversal is not completed taking one item from a new partition table and checking if a partition in an old partition table has the same name, if checking if both new and old partitions have a same size and starting address.

In a further embodiment, a software upgrade method for a mobile terminal includes scanning all files of a new version of software and an old version of software and obtaining corresponding file lists traversing a partition table of the new version of software, if traversal is completed, adding the partition table of the new version of software into a differential upgrade package, and ending; if traversal is not completed taking one item from the file list of the new version of software, and checking if a file in a file list of the old version of software has a same file name, if a file in the file list of the old version of software does not have the same file name, adding the file of the new version of software having the same name into the differential upgrade package in a word by word manner, and further traversing the partition table of the new version of software; if a file in the file list of the old version of software has the same file name, in a differentiating package comparison tool, using files of the new version of software and old version of software as input to generate a differentiating file, adding a corresponding description item in the differentiating file, and further traversing the partition table of the new version of software.

In yet another embodiment, a software upgrade method for a mobile terminal includes checking if the mobile terminal has a SD card, if the mobile terminal has a SD card acquiring a backup list from a differential upgrade package, reading an existing partition table from a mobile terminal memory, traversing the backup list and, if traversal is not completed, taking one item from the backup list, locating a corresponding partition in an existing partition table, checking a partition type, if the partition type is a partition of raw data type, adding cumulatively the partitions until a size is up to a total size of backup data; if the partition type is a partition of filesystem type, adding cumulatively a total size of all files in the partition up to the total size of the backup data, and further traversing the partition table of the new version of software; and if traversal is completed checking a size of a remaining space of the SD card of the mobile terminal, if the size of the remaining space of the SD card is larger than a total size of backup data, saving the backup data to be backed up in the mobile terminal into the SD card according to said backup list; and if the size of the remaining space of the SD card is larger than a total size of backup data, reporting an error, and ending.

In yet a further embodiment, a software upgrade method for a mobile terminal includes acquiring a backup list from a differential upgrade package, reading an existing partition table from a mobile terminal memory, traversing the backup list, if traversal is not completed, taking one item from the backup list, locating a corresponding partition in an existing partition table, checking a partition type, if the partition type is a partition of raw data type, reading data from a whole partition, and saving associated data as one file on the SD card; if the partition type is a partition of filesystem type, packing files in the partition to one file in a TAR file format, and saving this file onto the SD card, and further traversing the backup list; if traversal is completed, acquiring a new partition table from the differential upgrade package, re-partitioning the mobile terminal memory according to the new partition table, traversing the backup list, if traversal is not completed, taking one item from the backup list, locating a corresponding partition in the new partition table, checking the partition type, if the partition type is a partition of raw data type, writing the corresponding file that is backed up on the SD card into the partition; if the partition type is a partition of filesystem type, decompressing a corresponding TAR file that is backed up on the SD card, and writing all files in the TAR file into the partition, and further traversing the backup list.

In another embodiment, a software upgrade method for a mobile terminal includes decompressing a differential upgrade package to obtain a corresponding differentiating file and a differentiating file list, traversing the differentiating file list, if traversal is not completed, taking one item from the differentiating file list, generating corresponding new version files according to said differentiating file and to old version files in the mobile terminal, writing into the mobile terminal, and further traversing the backup list.

In a further embodiment, a software upgrade method for a mobile terminal includes according to a new version of software and an old version software, locating partition tables of the new version of software and the old version of software, respectively, comparing a difference between new and old partition tables, and generating a corresponding backup list; scanning all files of the new version of software and generating a differential upgrade package that comprises a partition table, of said new version software, and a backup list; according to the backup list in said differential upgrade package, detecting a total size of backup data to be backed up in the mobile terminal, and comparing said total size of the backup data with a remaining space of a SD card of the mobile terminal, and when said total size of the backup data is smaller than the remaining space of the SD card of the mobile terminal saving the backup data into the SD card according to said backup list, re-partitioning a mobile terminal memory according to said partition table of the new version of software in said differential upgrade package, detecting a partition type, and correspondingly writing the backup data on the SD card into the partition; and decompressing said differential upgrade package to obtain a corresponding differentiating file, generating corresponding new version files according to said differentiating file and old version files in the mobile terminal, and writing the new version files into the mobile terminal; wherein, the partition table has two forms: at a PC end, the partition table is present in a form of a partition table description file, which comprises a partition name, a partition size, a partition starting address and a partition type; at a cell phone end, the partition table is present in a form of memory header data and memory internal partition table data, which also comprises a partition name, a partition size, a partition starting address and a partition type; the PC end compares a difference between the new and old partition tables, and generates a corresponding backup list; decompressing the differential upgrade package to obtain a corresponding differentiating file and a differentiating file list, traversing the differentiating file list, if traversal is not completed, taking one item from the differentiating file list, generating corresponding new version files according to said differentiating file and to the old version files in the mobile terminal, writing into the mobile terminal, and further traversing the backup list.

In a further embodiment, a software upgrade system for a mobile terminal includes a backup list generating module for, according to a new version of software and a old version of software, locating partition tables of the new version of software and the old version of software, comparing a difference between the new and old partition tables, and generating a corresponding backup list; a differential upgrade package generating module for scanning all files of the new version of software and generating a differential upgrade package that comprises the partition table of said new version of software and the backup list; a capacity detection module for, according to the backup list in said differential upgrade package, detecting a total size of backup data to be backed up in the mobile terminal, and comparing said total size of the backup data with a remaining space of an SD card of the mobile terminal; a data backup and recovery module for saving the backup data to be backed up in the mobile terminal into the SD card according to said backup list, re-partitioning a mobile terminal memory according to said partition table of the new version of software in said differential upgrade package, detecting a partition type, and correspondingly writing the backup data on the SD card into the partition; an upgrade module for decompressing said differential upgrade package to obtain a corresponding differentiating file, generating corresponding new version files according to said differentiating file and old version files in the mobile terminal, and writing the new version files into the mobile terminal.

In yet another embodiment, a software upgrade system for a mobile terminal includes a partition table acquisition unit for, according to a new version of software and an old version of software, acquiring partition tables of the new version of software and the old version of software; a partition table traversing unit for traversing a partition table of the new version of software; a name comparison unit for taking one item from the new partition table, and checking if a partition in an old partition table has a same name; a size and starting address comparison unit for checking if both new and old partitions have a same size and starting address; and a backup list revising unit for checking a partition type and adding a description item in the backup list to describe a name and type of said partition.

In yet a further embodiment, a software upgrade system for a mobile terminal includes a SD card detecting unit for checking if the mobile terminal has a SD card; a first backup list traversing unit for acquiring a backup list from a differential upgrade package, reading an existing partition table from a mobile terminal memory, and traversing the backup list; a backup data total size calculation unit for taking one item from the backup list, locating a corresponding partition in the existing partition table, checking a partition type, if the partition type is a partition of raw data type, adding cumulatively the partitions until a size is up to a total size of backup data; if the partition type is a partition of filesystem type, adding cumulatively a total size of all files in the partition up to a total size of the backup data; and a capacity comparison unit for checking a size of a remaining space of the SD card of the mobile terminal, and comparing the total size of the backup data with the remaining space of the SD card of the mobile terminal.

In another embodiment, a software upgrade system for a mobile terminal includes a second backup list traversing unit for acquiring a backup list from a differential upgrade package, reading an existing partition table from a mobile terminal memory, and traversing the backup list; a data backup unit for taking one item from the backup list, locating a corresponding partition in a existing partition table, checking a partition type, if the partition type is a partition of raw data type, reading data from a whole partition, and saving associated data as one file on the SD card; if the partition type is a partition of filesystem type, packing files in the partition to one file in a TAR file format, and saving this file onto the SD card; a third backup list traversing unit for acquiring a new partition table from the differential upgrade package, re-partitioning the mobile terminal memory according to the new partition table, and traversing the backup list; and a data recovery unit for taking one item from the backup list, locating a corresponding partition in the new partition table, checking the partition type, if the partition type is a partition of raw data type, writing the corresponding file that is backed up on the SD card into the partition; if the partition type is a partition of filesystem type, decompressing the corresponding TAR file that is backed up on the SD card, and writing all files in the TAR file into the partition.

A software upgrade method and system for a mobile terminal effectively solves a problem that an existing FOTA mechanism is unable to handle circumstances in which a partition table of a mobile terminal memory needs to be revised due to software version upgrade or software requirement changes, and consequently the software cannot be upgraded. The method locates, according to a new version of software and an old version of software, partition tables of the new version of software and the old version of software, compares differences between the new and old partition tables, and generates a corresponding backup list, scans all files of the new version of software, generates a differential upgrade package that comprises the partition table of the new version of software and the backup list, according to the backup list in the differential upgrade package, detects a total size of backup data to be backed up in the mobile terminal, and compares a total size of the backup data with a remaining space of a SD card of the mobile terminal. When the total size of the backup data is smaller than the remaining space of the SD card of the mobile terminal, the backup data, to be backed up in the mobile terminal, is saved into the SD card according to said backup list, the mobile terminal memory is re-partitioned according to said partition table of the new version of software in the differential upgrade package, a partition type is detected, the backup data is correspondingly written on the SD card into the partition, the differential upgrade package is decompressed to obtain a corresponding differentiating file, new version files are generated according to the differentiating file and the old version files in the mobile terminal, and the new version files are written into the mobile terminal to complete the upgrade. Thereby, the mobile terminal can be upgraded even in the circumstance that the software upgrade needs to change the memory partition table.

DETAILED DESCRIPTION

A software upgrade method and system for a mobile terminal are provided. To make the objects, technical solutions and advantages of the present invention clear, the methods and systems are described in detail with reference to the accompanying drawings and exemplary embodiments. It should be understood that the exemplary embodiments are for illustrative purposes. The exemplary embodiments are not intended to limit the scope of the appended claims in any way.

Figure 1:
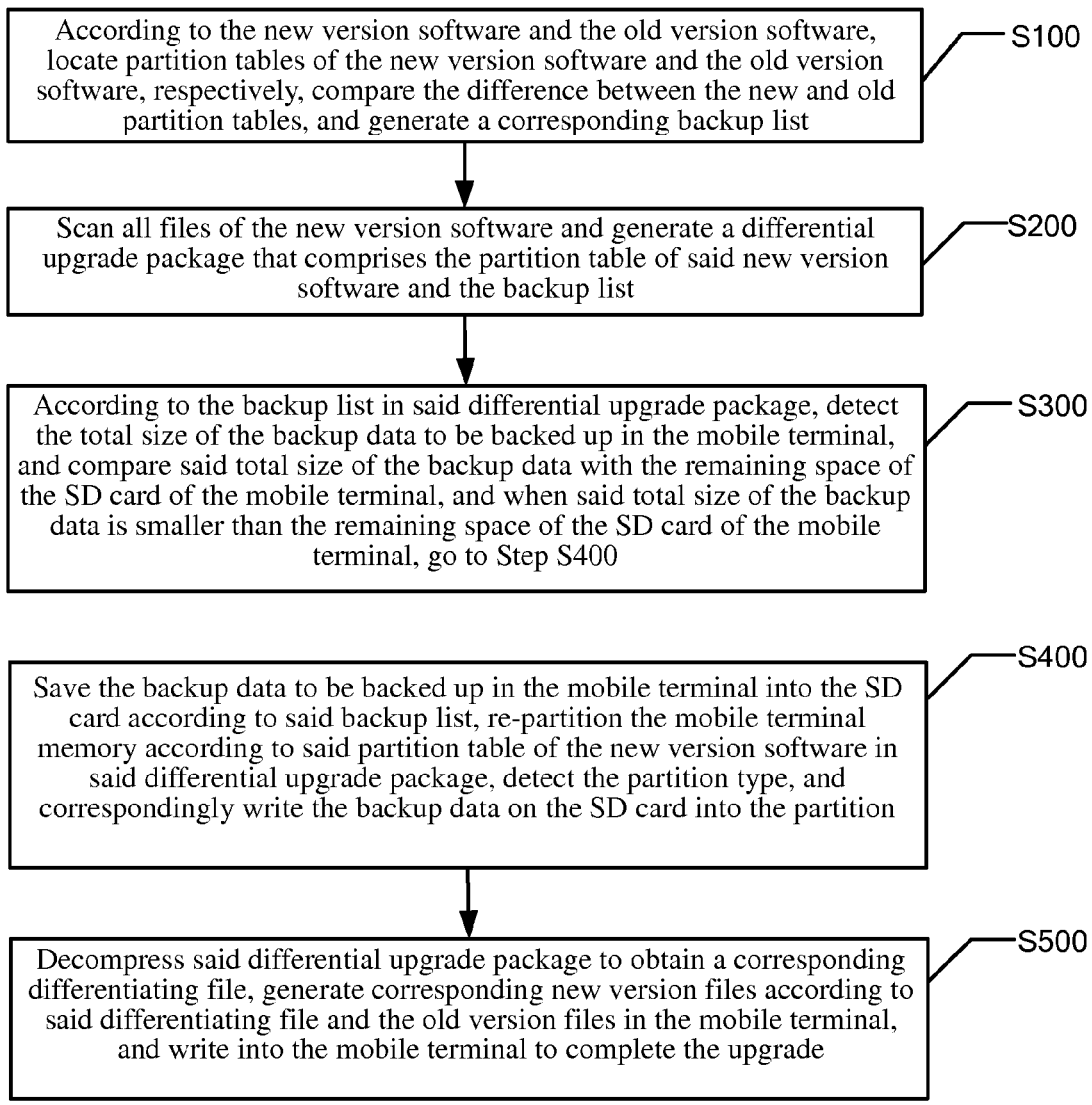
FIG. 1 depicts a flow chart of an exemplary embodiment of a software upgrade method for a mobile terminal according to the present invention.

Turning to FIG. 1, a flow chart of a software upgrade method for a mobile terminal may include, according to a new version of software and an old version of software, locating partition tables of the new version of software and the old version of software, comparing a difference between the new and old partition tables, and generating a corresponding backup list (block S100). The method may also include scanning all files of the new version of software and generating a differential upgrade package that comprises the partition table of the new version of software and the backup list (block S200). The method may further include, according to the backup list in the differential upgrade package, detecting a total size of backup data to be backed up in a mobile terminal, and comparing the total size of the backup data with a remaining space of an SD card of the mobile terminal (block S300). When the total size of the backup data is smaller than the remaining space of the SD card of the mobile terminal, the method may include saving the backup data to be backed up in the mobile terminal into the SD card according to the backup list, re-partitioning a mobile terminal memory according to the partition table of the new version of software in the differential upgrade package, detecting a partition type, and correspondingly writing the backup data on the SD card into the partition (block S400). The method may also include decompressing the differential upgrade package to obtain a corresponding differentiating file, generating corresponding new version files according to the differentiating file and old version files in the mobile terminal, and writing the new version files into the mobile terminal to complete the upgrade.

An associated mobile terminal may be, for example, a cell phone, and blocks S100 and S200 may be completed at a PC end (e.g., a server), while blocks S300 to S500 may be completed in the cell phone. The PC end may generate a corresponding differential upgrade package and may send the differential upgrade package to the cell phone. Alternatively, the cell phone may download the differential upgrade package, and the software upgrade may be performed in the cell phone. According to a new version of software and an old version of software, a PC end may locate partition tables of the new version of software and the old version of software, may compare a difference between the new and old partition tables, and may generate a corresponding backup list (block S100). The PC end may obtain the new and old partition tables, respectively, according to the new version of software and the old version of software. The partition tables may have two forms: at a PC end, the partition table may be present in a form of a "partition table description file", which may include a partition name, a partition size, a partition starting address and a partition type. At a cell phone end, the partition table may be present in the form of "memory header data and memory internal partition table data", which may include a partition name, a partition size, a partition starting address and a partition type. The PC end may compare a difference between the new and old partition tables, and may generate a corresponding backup list (block S100). The backup list may be a list generated at the PC end, and may describes partitions to be backed up. The program at the cell phone end may complete the backup action according to this list (block S100).

A method of upgrading software may include acquiring partition tables of the new version of software and the old version of software (block S110). The method may also include traversing the partition table of the new version. If traversal is not completed, the method may include taking one item from the new partition table, and checking if a partition in the old partition table has a same name (block S130). If the item taken from the new partition table does not have the same name as a partition in the old partition table, the method may return to block S120. If the item taken from the new partition table has the same name as a partition in the old partition table, the method may include checking if both new and old partitions have a same size and starting address (block S140). If the new and old partitions have the same name, the method may return to block S120. If the new and old partitions do not have the same name, the method may include checking a partition type, adding a description item in the backup list to describe the name and type of the partition, and returning to block S120.

Figure 2:
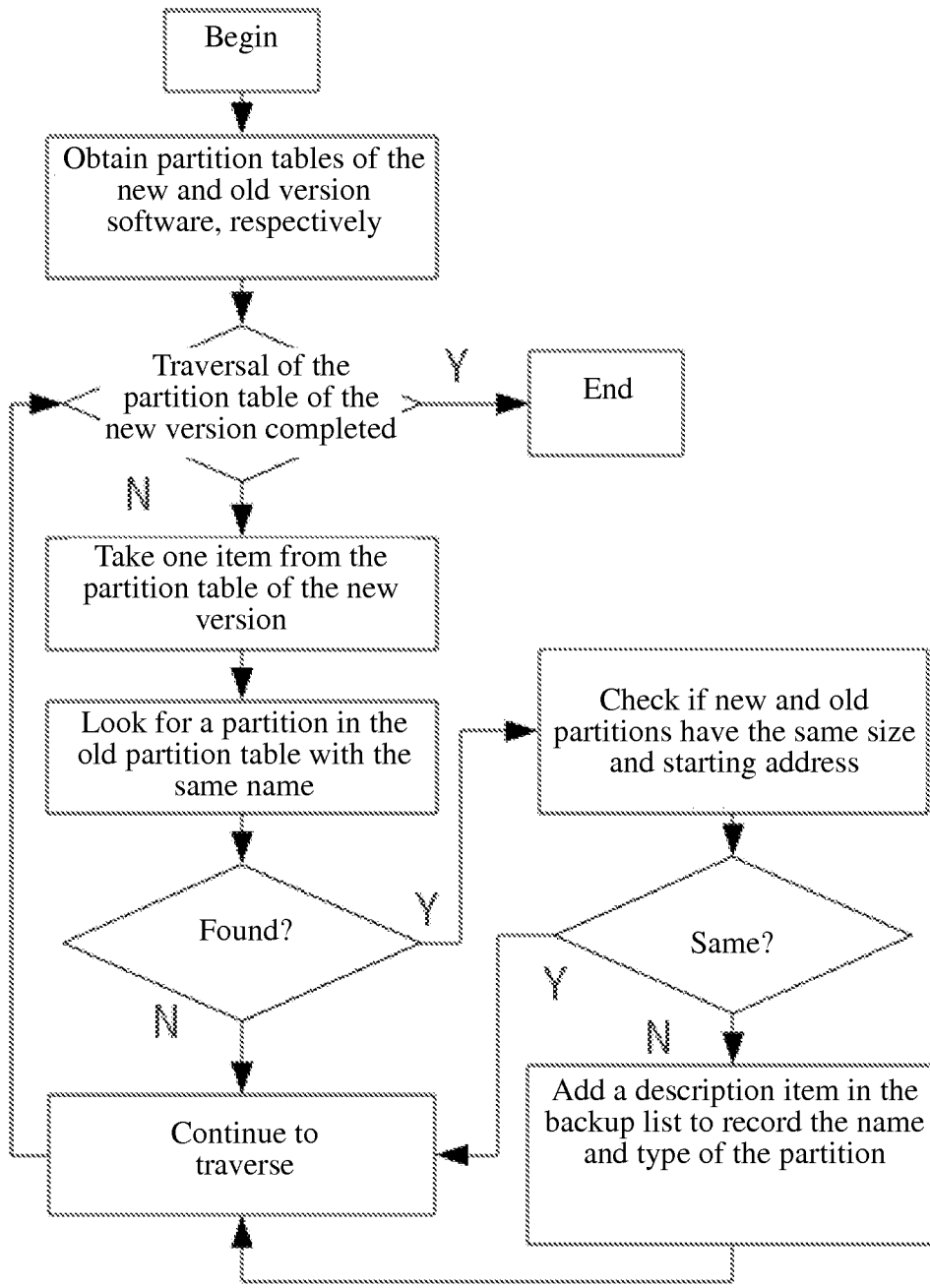
FIG. 2 depicts a flow chart of an exemplary application embodiment of generating a backup list in a software upgrade method for a mobile terminal according to the present invention.

With reference to FIG. 2, a flow chart of a method of generating a backup list in a software upgrade method for a mobile terminal may include a PC end that may acquire, according to a new and an old version of software, partition tables of the new and old versions of software, respectively, may traverse the partition table of the new version, may take one item from the new partition table, and check if a partition in the old partition table has a same name. If the item taken from the new partition table has the same name of the partition in the old partition table, the method may check if both the new and old partitions have a same size and starting address. If the item taken from the new partition table has the same name of the partition in the old partition table, the method may continue to traverse the partition table. The method may check if both new and old partitions have a same size and starting address. If the item taken from the new partition table has the same size and starting address of the partition in the old partition table, the method may continue to traverse the partition table. If the item taken from the new partition table does not have the same size and starting address of the partition in the old partition table, the method may continue to check the partition type, and may add a description item in the backup list to describe the name and type of the partition. After adding the description item, the method may continue to traverse the partition table until all items in the new partition table have been taken out, i.e. traversal is completed.

In block S200, the PC end may scan all files of the new version of software and may generate a differential upgrade package that may include a partition table of the new version of software and a backup list. Block S200 of the method may include scanning all files of the new version and old version of software and obtaining corresponding file lists (block S210). The method may also include traversing the partition table of the new version (block S220). If traversal is not completed, the method may proceed to block S230. If traversal is completed, the method may include adding the partition table of the new version into the differential upgrade package, and may end. The method may include taking one item from the file list of the new version, and checking if a file in the file list of the old version has the same file name. If the file in the file list of the old version does not have the same file name as the item taken from the file list of the new version, the method may include adding the file of the new version into the differential upgrade package in a word by word manner, and may continue to block S220. If the file in the file list of the old version has the same file name as the item taken from the file list of the new version, the method may include, in a differentiating package comparison tool, using files of the new and old versions as input to generate a differentiating file, adding a corresponding description item in the differentiating file, and returning to block S220.

Figure 3:
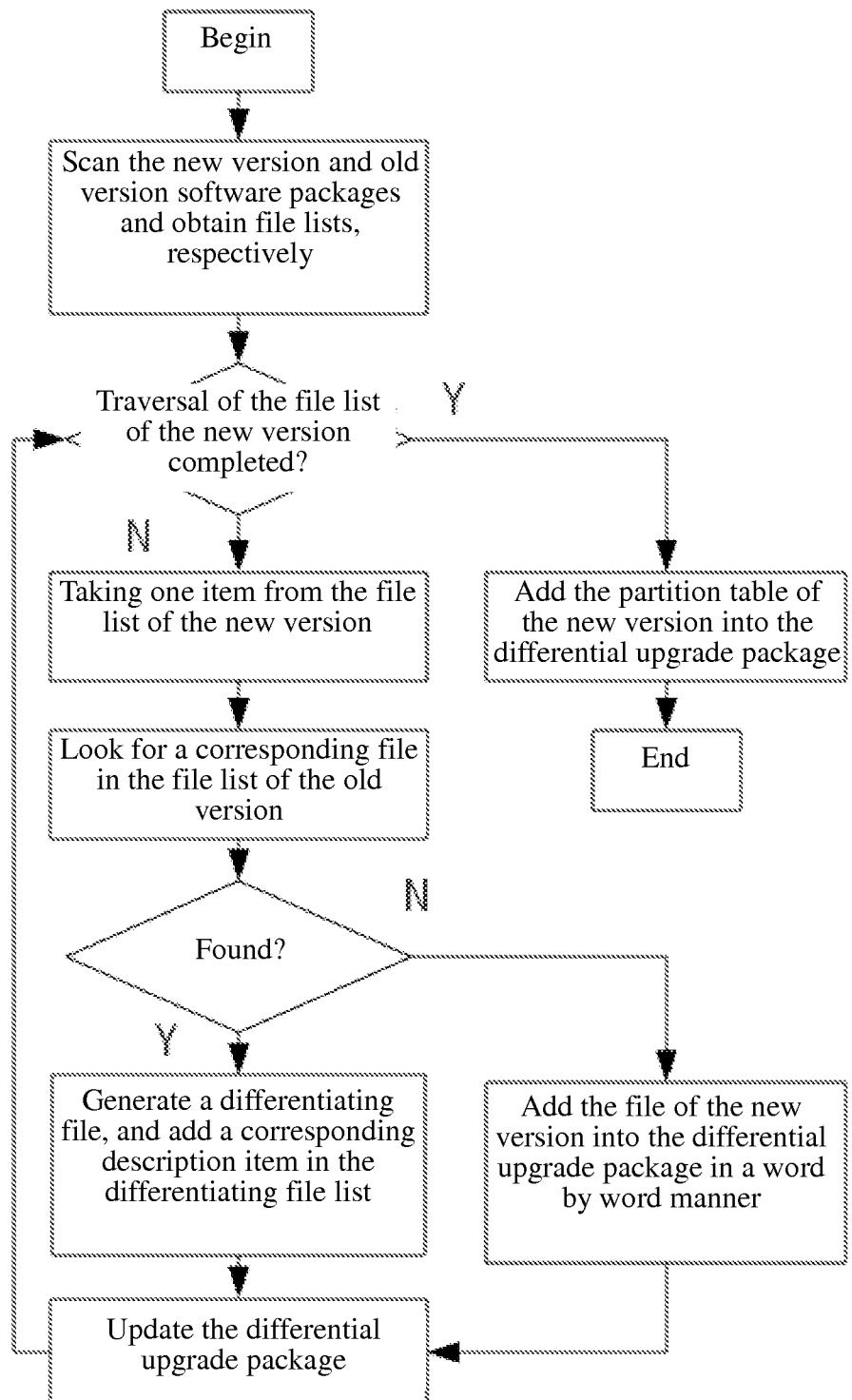
FIG. 3 depicts a flow chart of an exemplary application embodiment of generating a differential upgrade package in a software upgrade method for a mobile terminal according to the present invention.

Turning to FIG. 3, a flow chart of a method of generating a differential upgrade package in a software upgrade method for a mobile terminal may include a PC end that scans all files of the new version and the old version to generate corresponding file lists, respectively, and traverses the file list of the new version. If the traversal of the file list of the new version is not completed, the method may take one item from the file list of the new version. If the traversal of the file list of the new version is completed, the method may end. The method may check if a file in the old version has a same file name as that of the file taken from the file list of the new version. If the file in the old version does not have the same file name as that of the file taken from the file list of the new version, the method may add the file of the new version into the differential upgrade package in a word by word manner, may update the differential upgrade package, and may continue to traverse the file list. If the file in the old version has the same file name as that of the file taken from the file list of the new version, the method may use bsdiff (a differentiating package comparison tool) as the tool, may use files of the new and old versions as input to generate a differentiating file, and may write corresponding information, such as file name and check code, into the differentiating file list. The method may continue to traverse the file list until the traversal of the file list of the new version is completed, and may add the file list of the new version into the differential upgrade package.

In block S300, according to a backup list in the differential upgrade package, the mobile terminal may detect a total size of backup data to be backed up in the mobile terminal, may compare a total size of the backup data with the remaining space of a SD card of the mobile terminal, and when the total size of the backup data is smaller than the remaining space of the SD card of the mobile terminal, the method may proceed to block S400. Block S300 may include checking if the mobile terminal has a SD card (block S310). If the mobile terminal has a SD card, the method may proceed to block S320. If the mobile terminal does not have a SD card, the method may include reporting an error, and ending. The method may include acquiring a backup list from a differential upgrade package, reading an existing partition table from a mobile terminal memory, and traversing the backup list. If traversal is not completed, the method may proceed to block S330. If traversal is completed, the method may proceed to block S340. The method may include taking one item from the backup list, locating the corresponding partition in the existing partition table, and checking a partition type. If the partition type is a partition of raw data type, the method may include adding cumulatively the partitions until the size is up to a total size of the backup data. If the partition type is a partition of filesystem type, the method may include adding cumulatively a total size of all files in the partition up to a total size of the backup data. The method may further include returning to block S320 until traversal is completed. The method may include checking a size of a remaining space of the SD card of the mobile terminal and, if the remaining space of the SD card is larger than the total size of the backup data, proceeding to block S400. Otherwise, the method may include reporting an error, and ending.

Figure 4:
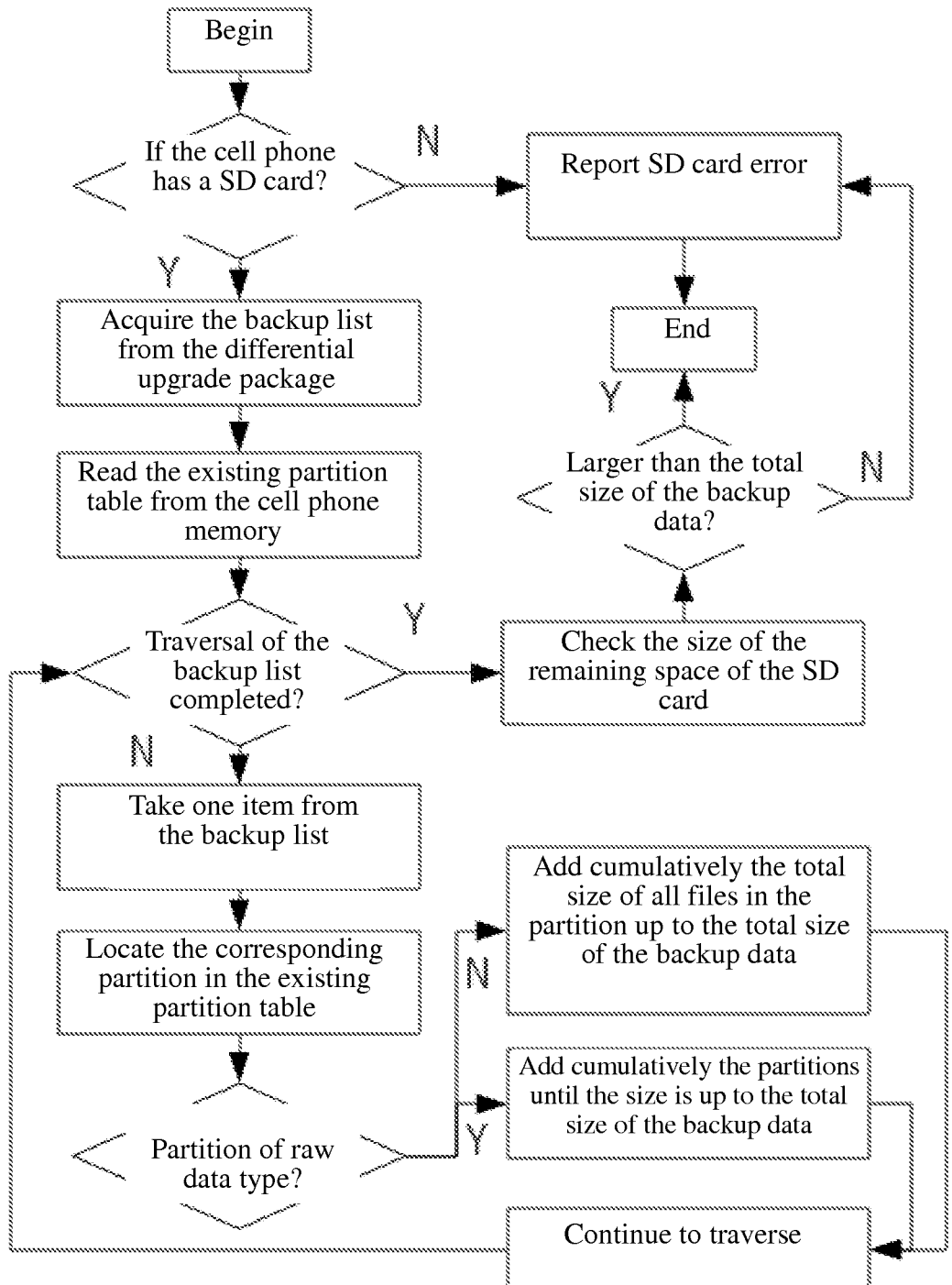
FIG. 4 depicts a flow chart of an exemplary application embodiment of detecting the space of a SD card in a software upgrade method for a mobile terminal according to the present invention.

With reference to FIG. 4, a flow chart of a method of detecting space of a SD card in a software upgrade method for a mobile terminal may include a mobile terminal that checks if the space of the SD card is sufficient. In particular, the mobile terminal may check if the mobile terminal has a SD card. If the mobile terminal has a SD card, the method may continue. If the mobile terminal does not have a SD card, the method may report an error, and may end. The mobile terminal may acquire a backup list from the differential upgrade package, may read an existing partition table from a mobile terminal memory, and may initialize a variable "total size of the backup data". Subsequently, the mobile terminal may traverse the backup list, take one item from the backup list and, if traversal is not completed, the terminal may proceed to the next block in the method. If all items have been taken out, i.e. the traversal is completed, the terminal may check a size of the remaining space of the SD card. The mobile terminal may, according to the one item taken from the backup list, locate a corresponding partition in the existing partition table, and check a partition type. If the partition type is a partition of raw data type, the mobile terminal may add cumulatively the partitions until a size is up to a total size of the backup data. If the partition type is a partition of filesystem type, the mobile terminal may add cumulatively a total size of all files in the partition up to a total size of the backup data, until traversal is completed and the total size of the backup data, to be backed up by the mobile terminal, is complete. The mobile terminal may check a size of the remaining space of the SD card and, if the remaining size is larger than the total size of the backup data, the mobile terminal may proceed to block S400 for upgrade of the software (block S400). Otherwise, the mobile terminal may report an error, and end the method. As for the method to calculate the data size of a partition of raw data type, the data size in the partition may be unknown since there is no META data in a partition of raw data type. Therefore, the data size in the partition may be estimated as being equal to the partition size. As for the method to calculate the data size of a partition of filesystem type, the sizes of all files in the partition may be added to derive a data size in the partition.

The mobile terminal may save the backup data to be backed up in the mobile terminal into the SD card according to the backup list, may re-partition a mobile terminal memory according to the partition table of the new version of software in the differential upgrade package, may detect the partition type, and may correspondingly write the backup data on the SD card into the partitions (block S400). In block S400 the method may include acquiring a backup list from the differential upgrade package, reading the existing partition table from the mobile terminal memory, traversing the backup list and, if traversal is not completed, may proceed to block S420. If traversal is completed, the method may proceed to block S430. The method may include taking one item from the backup list, locating the corresponding partition in the existing partition table, checking the partition type. If the partition type is a partition of raw data type, the method may include reading data from the whole partition, and saving the data as one file on the SD card. If the partition type is a partition of filesystem type, the method may include packing files in the partition to one file in a TAR file format, saving this file onto the SD card, and returning to block S410 until traversal is completed. The method may also include acquiring a new partition table from a differential upgrade package, re-partitioning the mobile terminal memory according to the new partition table, traversing the backup list and, if traversal is not completed, the method may proceed to S440. If traversal is completed, the method may be ended. The method may further include taking one item from the backup list, locating a corresponding partition in the new partition table, checking the partition type. If the partition type is a partition of raw data type, the method may include writing the corresponding file that is backed up on the SD card into the partition. If the partition type is a partition of filesystem type, the method may include decompressing the corresponding TAR file that is backed up on the SD card, and writing all files in the TAR file into the partition. In particular, the method may include restoring the backup data on the SD card to a corresponding partition, and returning to block S430 until traversal is completed.

Figure 5:
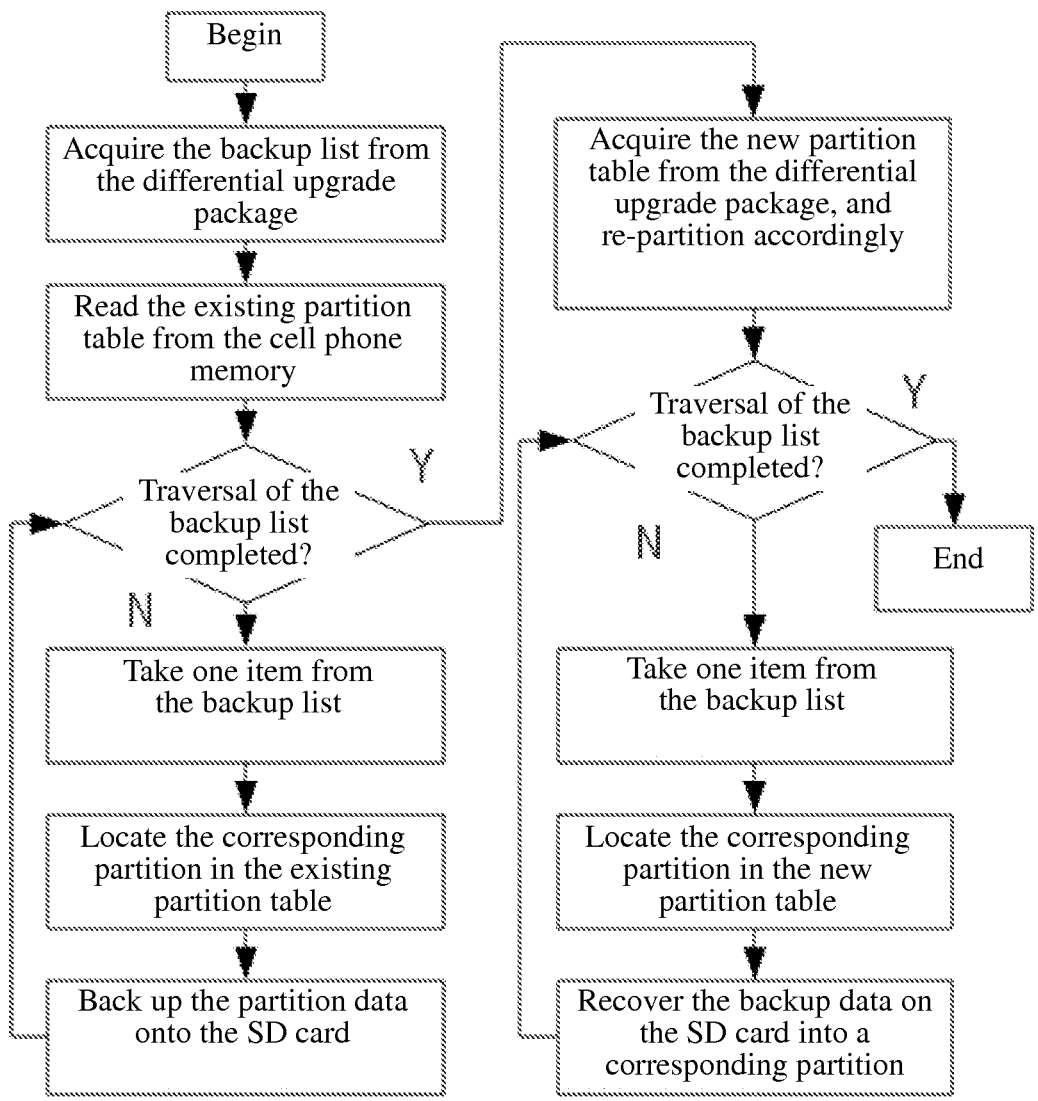
FIG. 5 depicts a flow chart of an exemplary application embodiment of backing up and writing data in a software upgrade method for a mobile terminal according to the present invention.

Turning to FIG. 5, a flow chart of a method of backing up and writing data in a software upgrade method for a mobile terminal that may include a cell phone that backs up and restores data. The cell phone may acquire a backup list from a differential upgrade package, and may read an existing partition table from a cell phone memory. The cell phone may traverse the backup list, take one item from the backup list, locate a corresponding partition in an existing partition table, and may check a partition type. If the partition type is a partition of raw data type, the cell phone may read data from the whole partition, and may save the data as one file on the SD card. If the partition type is a partition of filesystem type, the cell phone may pack files in a partition to one file in a TAR file format, and may save this file onto the SD card, until all items of the backup list have been taken out, i.e. the traversal is completed, and consequently all data in the cell phone to be backed up have been backed up to the SD card. Subsequently, the cell phone may acquire a new partition table from the differential upgrade package, re-partition a cell phone memory according to the new partition table, traverse the backup list, take one item from the backup list, locate a corresponding partition in the new partition table, and may check a partition type. If the partition type is a partition of raw data type, the cell phone may write the corresponding file that is backed up on the SD card into the partition. If the partition type is a partition of filesystem type, the cell phone may decompress the corresponding TAR file that is backed up on the SD card, and may write all files in the TAR file into the partition, until all items of the backup list have been taken out, i.e. the traversal is completed, and consequently the backup data on the SD card are rewritten into the new partitions. As for the backup method for a partition of raw data type, as described above, data of an entire partition may be read in the form of a raw data stream and saved as one file on the SD card. As for the backup method for a partition of filesystem type, the method may be completed in the TAR file format. The TAR file format may be a file packaging format that complies with the GPL license. TAR may be used to package all files in a partition into one file and then save this file onto a SD card.

A mobile terminal may decompress a differential upgrade package to obtain a corresponding differentiating file, generate corresponding new version files according to the differentiating file and the old version files in the mobile terminal, and may write into the mobile terminal to complete the upgrade (block S500). Decompressing the differential upgrade package to obtain the corresponding differentiating file and the differentiating file list may include traversing the differentiating file list and, if traversal is not completed, proceeding to block S520. If traversal is completed, the method may end (block S520). The method may include taking one item from the differentiating file list, generating corresponding new version files according to a differentiating file and old version files in the mobile terminal, writing the new version files into the mobile terminal, and returning to block S510 until traversal is completed.

Figure 6:
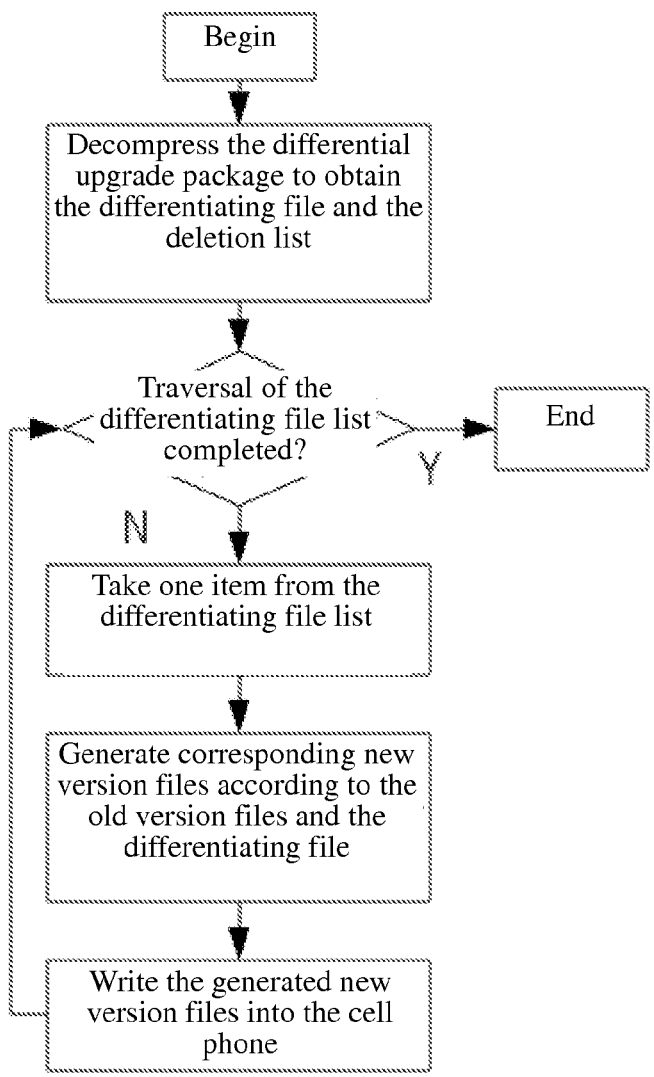
FIG. 6 depicts a flow chart of an application embodiment of applying the differential upgrade package in a software upgrade method for a mobile terminal according to the present invention.

With respect to FIG. 6, a flow chart of a method of applying the differential upgrade package in a software upgrade method for a mobile terminal may include a cell phone end that decompresses a differential upgrade package to obtain a corresponding differentiating file and a differentiating file list, traverses the differentiating file list, takes one item from the differentiating file list, generates corresponding new version files, according to an existing files in the cell phone and the differentiating file, and writes the new version files into the cell phone until traversal is completed. In such a way, the software upgrade may be completed for the cell phone.

A software upgrade method for a mobile terminal may be an optimization method for an existing FOTA upgrade method, may effectively solve a problem that software cannot be upgraded as the partition table of a cell phone memory is changed, and may avoid a problem that the existing FOTA upgrade method cannot handle this type of situation. More particularly, in the FOTA upgrade method, the original partition table has to be kept, leading to more difficult development and users being unable to have the latest and the best user experience. As a result of implementing the methods of the present disclosure, the mobile terminal can be upgraded even in the circumstance that the software upgrade needs to change the memory partition table. The implementation method thereof may be simple and achieved through software, and the cost is low.

Figure 7:
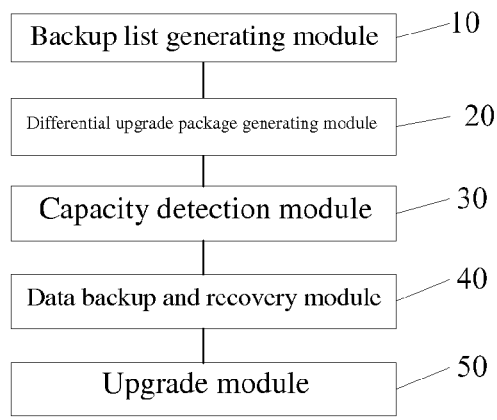
FIG. 7 depicts a structural block diagram of an exemplary embodiment of a software upgrade system for a mobile terminal according to the present invention.

Turning to FIG. 7, a structural block diagram of a software upgrade system for a mobile terminal may include a backup list generating module 10 for, according to a new version of software and an old version of software, locating partition tables of the new version of software and the old version of software, respectively, comparing a difference between the new and old partition tables, and generating a corresponding backup list (block S100). The system may also include a differential upgrade package generating module 20 for scanning all files of the new version of software and generating a differential upgrade package that may include a partition table of the new version software and a backup list (block S200). The system may further include a capacity detection module 30 for, according to the backup list in the differential upgrade package, detecting a total size of backup data to be backed up in the mobile terminal, and comparing the total size of the backup data with a remaining space of a SD card of the mobile terminal (block S300). The system may yet also include a data backup and recovery module 40 for saving the backup data to be backed up in the mobile terminal into the SD card according to the backup list, re-partitioning a mobile terminal memory according to a partition table of the new version software in the differential upgrade package, detecting a partition type, and correspondingly writing the backup data on the SD card into the partition (block S400). The system may yet further include an upgrade module for decompressing the differential upgrade package to obtain a corresponding differentiating file, generating corresponding new version files according to the differentiating file and the old version files in the mobile terminal, and writing the new version files into the mobile terminal to complete the upgrade (block S500).

Specifically, the backup list generating module 10 may locate, according to the new version software and the old version software, partition tables of the new version software and the old version software, respectively, may compare a difference between the new and old partition tables, and may generate a corresponding backup list. The differential upgrade package generating module 20 may scan all files of the new version software and may generate a differential upgrade package that includes a partition table of the new version software and the backup list. The capacity detection module 30 may detect, according to the backup list in the differential upgrade package, a total size of the backup data to be backed up in the mobile terminal, and may compare the total size of the backup data with a remaining space of a SD card of the mobile terminal. When the total size of the backup data is smaller than the remaining space of the SD card of the mobile terminal, the data backup and recovery module 40 may save the backup data to be backed up in the mobile terminal into the SD card according to the backup list, may re-partition the mobile terminal memory according to the partition table of the new version software in the differential upgrade package, may detect a partition type, and may correspondingly write the backup data on the SD card into the partitions. Subsequently, the upgrade module 50 may decompress the differential upgrade package to obtain a corresponding differentiating file, may generate corresponding new version files according to the differentiating file and the old version files in the mobile terminal, and may write the new version files into the mobile terminal to complete the upgrade. The backup list generating module 10 and the differential upgrade package generating module 20 may be, for example, disposed at a PC end, e.g., a server end. The capacity detection module 30, the data backup and recovery module 40 and the upgrade module 50 may be, for example, disposed at the mobile terminal for receiving the differential upgrade package from the PC end and carrying out corresponding software upgrade.

The backup list generating module 10 may include a partition table acquisition unit for, according to the new version of software and the old version of software, acquiring partition tables of the new version of software and the old version software. The backup list generating module 10 may also include a partition table traversing unit for traversing the partition table of the new version. The backup list generating module 10 may further include a name comparison unit for taking one item from the new partition table, and checking if a partition in the old partition table has the same name. The backup list generating module 10 may yet also include a size and starting address comparison unit for checking if both new and old partitions have a same size and starting address. The backup list generating module 10 may yet further include a backup list revising unit for checking a partition type and adding a description item in the backup list to describe a name and type of the partition.

The capacity detection module 30 may include a SD card detecting unit for checking if the mobile terminal has a SD card. The capacity detection module 30 may further include a first backup list traversing unit for acquiring the backup list from the differential upgrade package, reading an existing partition table from a mobile terminal memory, and traversing the backup list. The capacity detection module 30 may yet also include a backup data total size calculation unit for taking one item from the backup list, locating a corresponding partition in the existing partition table, checking a partition type and, if the partition type is a partition of raw data type, adding cumulatively the partitions until a size is up to a total size of the backup data. If the partition type is a partition of filesystem type, adding cumulatively a total size of all files in the partition up to a total size of the backup data. The capacity detection module 30 may yet further include a capacity comparison unit for checking a size of the remaining space of the SD card of the mobile terminal, and comparing a total size of the backup data with the remaining space of the SD card of the mobile terminal.

The data backup and recovery module 40 may include a second backup list traversing unit for acquiring the backup list from the differential upgrade package, reading an existing partition table from a mobile terminal memory, and traversing the backup list. The data backup and recovery module 40 may also include a data backup unit for taking one item from the backup list, locating a corresponding partition in the existing partition table, checking a partition type, if the partition type is a partition of raw data type, reading data from the whole partition, and saving these data as one file on the SD card. If the partition type is a partition of filesystem type, packing files in the partition to one file in a TAR file format, and saving this file onto the SD card. The data backup and recovery module 40 may further include a third backup list traversing unit for acquiring a new partition table from the differential upgrade package, re-partitioning the mobile terminal memory according to the new partition table, and traversing the backup list. The data backup and recovery module 40 may yet further include a data recovery unit for taking one item from the backup list, locating a corresponding partition in the new partition table, checking a partition type and, if the partition type is a partition of raw data type, writing the corresponding file that is backed up on the SD card into the partition. If the partition type is a partition of filesystem type, decompressing the corresponding TAR file that is backed up on the SD card, and writing all files in the TAR file into the partition.

Since the differential upgrade package generating module 20 and the upgrade module 50 may be the same as the existing FOTA method, they will not be described in detail herein.

In summary, a software upgrade method and system for a mobile terminal may locate, according to a new version of software and an old version of software, partition tables of the new version of software and the old version of software, respectively, may compare a difference between the new and old partition tables, and may generate a corresponding backup list. The method and systems may scan all files of the new version of software and may generate a differential upgrade package that may include the partition table of the new version software and the backup list. The methods and systems may, according to the backup list in the differential upgrade package, detect a total size of backup data to be backed up in the mobile terminal, and may compare the total size of the backup data with a remaining space of a SD card of the mobile terminal, and when the total size of the backup data is smaller than the remaining space of the SD card of the mobile terminal, may save the backup data to be backed up in the mobile terminal into the SD card according to the backup list, may re-partition the mobile terminal memory according to the partition table of the new version software in the differential upgrade package, may detect the partition type, and may correspondingly write the backup data on the SD card into the partitions. The methods and systems may decompress the differential upgrade package to obtain a corresponding differentiating file, may generate corresponding new version files according to the differentiating file and the old version files in the mobile terminal, and may write into the mobile terminal to complete the upgrade, such that the mobile terminal can be upgraded even in a circumstance that the software upgrade needs to change the memory partition table. The implementation method thereof may be simple and achieved through software, and a cost may be low, which may be convenient for users.

It should be understood that the above exemplary embodiments are for illustrative purposes, and to those skilled in the art improvements or modifications may be made according to the description above, and all of these improvements and modifications shall be encompassed by the appended claims.

The invention claimed is:

1. A software upgrade method for a mobile terminal, the method comprising:
   according to a new version software and an old version of software, locating partition tables of the new version of software and the old version of software, respectively, comparing a difference between new and old partition tables, and generating a corresponding backup list;
   scanning all files of the new version of software and generating a differential upgrade package that comprises a partition table, of said new version of software, and the backup list;
   according to the backup list, detecting a total size of backup data to be backed up in the mobile terminal, and comparing said total size of the backup data with a remaining space of a SD card of the mobile terminal, and when said total size of the backup data is smaller than the remaining space of the SD card of the mobile terminal:
   saving the backup data into the SD card according to said backup list, re-partitioning a mobile terminal memory according to said partition table of the new version of software in said differential upgrade package, detecting a partition type, and correspondingly writing the backup data on the SD card into the partition; and
   decompressing said differential upgrade package to obtain a corresponding differentiating file, generating corresponding new version files according to said differentiating file and old version files in the mobile terminal, and writing the new version files into the mobile terminal.

2. The software upgrade method for a mobile terminal according to claim 1, further comprising:
   according to the new version of software and the old version of software, acquiring partition tables of the new version of software and the old version of software, respectively;
   traversing the partition table of the new version of software, if traversal is not completed,
   taking one item from the new partition table and checking if a partition in the old partition table has the same name, and
   checking if both new and old partitions have a same size and starting address.

3. The software upgrade method for a mobile terminal according to claim 1, further comprising:
   scanning all files of the new version and old version of software and obtaining corresponding file lists;
   traversing a partition table of the new version of software, if traversal is completed, adding the partition table of the new version into the differential upgrade package, and ending;
   if traversal is not completed:
   taking one item from a file list of the new version of software, and checking if a file in a file list of the old version of software has a same file name, if a file in the file list of the old version of software does not have the same file name, adding the file of the new version of software having the same name into the differential upgrade package in a word by word manner, and further traversing the partition table of the new version of software; if a file in the file list of the old version of software has the same file name,
   in a differentiating package comparison tool, using files of the new version of software and old version of software as input to generate a differentiating file, adding a corresponding description item in the differentiating file, and further traversing the partition table of the new version of software.

4. The software upgrade method for a mobile terminal according to claim 1, further comprising:
   checking if the mobile terminal has a SD card, if the mobile terminal has a SD card:
   acquiring the backup list from the differential upgrade package, reading an existing partition table from the mobile terminal memory, traversing the backup list and, if traversal is not completed,
   taking one item from the backup list, locating a corresponding partition in the existing partition table, checking a partition type, if the partition type is a partition of raw data type, adding cumulatively the partitions until a size is up to a total size of the backup data; if the partition type is a partition of filesystem type, adding cumulatively a total size of all files in the partition up to the total size of the backup data, and further traversing the partition table of the new version of software; and
   if traversal is completed:
   checking a size of a remaining space of the SD card of the mobile terminal, if the size of the remaining space of the SD card is larger than a total size of backup data, saving the backup data to be backed up in the mobile terminal into the SD card according to said backup list; and
   if the size of the remaining space of the SD card is larger than a total size of backup data, and if not, reporting an error, and ending.

5. The software upgrade method for a mobile terminal according to claim 1, further comprising:
   acquiring the backup list from the differential upgrade package, reading an existing partition table from a mobile terminal memory, traversing the backup list, if traversal is not completed,
   taking one item from the backup list, locating a corresponding partition in an existing partition table, checking a partition type, if the partition type is a partition of raw data type, reading data from a whole partition, and saving associated data as one file on the SD card; if the partition type is a partition of filesystem type, packing files in the partition to one file in the TAR file format, and saving this file onto the SD card, and further traversing the backup list;
   if traversal is completed,
   acquiring a new partition table from the differential upgrade package, re-partitioning the mobile terminal memory according to the new partition table, traversing the backup list, if traversal is not completed,
   taking one item from the backup list, locating a corresponding partition in the new partition table, checking the partition type, if the partition type is a partition of raw data type, writing the corresponding file that is backed up on the SD card into the partition; if the partition type is a partition of filesystem type, decompressing a corresponding TAR file that is backed up on the SD card, and writing all files in the TAR file into the partition, and further traversing the backup list.

6. The software upgrade method for a mobile terminal according to claim 1, further comprising:
   decompressing the differential upgrade package to obtain a corresponding differentiating file and a differentiating file list, traversing the differentiating file list, if traversal is not completed, taking one item from the differentiating file list, generating corresponding new version files according to said differentiating file and to the old version files in the mobile terminal, writing into the mobile terminal, and further traversing the backup list.

7. A software upgrade method for a mobile terminal, the method comprising:

according to a new version software and an old version of software, locating partition tables of the new version software and the old version of software, locating partition tables of the new version of software and the old version of software, respectively, comparing a difference between new and old partition tables, and generating a corresponding backup list;

scanning all files of the new version of software and generating a differential upgrade package that comprises a partition table, of said new version of software and the backup list;

according to the backup list in said differential upgrade package, detecting a total size of backup data to be backed up in the mobile terminal, and comparing said total size of the backup data with a remaining space of a SD card of the mobile terminal, and when said total size of the backup data is smaller than the remaining space of the SD card of the mobile terminal:

saving the backup data into the SD card according to said backup list, re-partitioning a mobile terminal memory according to said partition table of the new version of software in said differential upgrade package, detecting a partition type, and correspondingly writing the backup data on the SD card into the partition; and decompressing said differential upgrade package to obtain a corresponding differentiating file, generating corresponding new version files according to said differentiating file and old version files in the mobile terminal, and writing the new version files into the mobile terminal;

wherein, the partition table has two forms: at a PC end, the partition table is present in a form of a partition table description file, which comprises a partition name, a partition size, a partition starting address and a partition type; at a cell phone end, the partition table is present in a form of memory header data and memory internal partition table data, which also comprises a partition name, a partition size, a partition starting address and a partition type; the PC end compares a difference between the new and old partition tables, and generates the corresponding backup list;

decompressing the differential upgrade package to obtain a corresponding differentiating file and a differentiating file list, traversing the differentiating file list, if traversal is not completed, taking one item from the differentiating file list, generating corresponding new version files according to said differentiating file and to the old version files in the mobile terminal, writing into the mobile terminal, and further traversing the backup list.

8. The software upgrade method for a mobile terminal according to claim 7, further comprising:

according to the new version of software and the old version of software, acquiring partition tables of the new version of software and the old version of software, respectively;

traversing the partition table of the new version of software, if traversal is not completed:

taking one item from the new partition table, and checking if a partition in the old partition table has the same name, and checking if both new and old partitions have a same size and starting address.

9. The software upgrade method for a mobile terminal according to claim 7, further comprising:

scanning all files of the new version of software and old version of software and obtaining corresponding file lists;

traversing a partition table of the new version of software, if traversal is completed, adding the partition table of the new version into the differential upgrade package, and ending;

if traversal is not completed:

taking one item from the file list of the new version of software, and checking if a file in the file list of the old version of software has the same file name, if a file in the file list of the old version of software does not have the same file name, adding the file of the new version of software having the same name into the differential upgrade package in a word by word manner, and further traversing the partition table of the new version of software;

if a file in the file list of the old version of software has the same file name, in a differentiating package comparison tool, using files of the new version of software and old version of software as input to generate a differentiating file, adding a corresponding description item in the differentiating file, and further traversing the partition table of the new version of software.

10. The software upgrade method for a mobile terminal according to claim 7, further comprising:

checking if the mobile terminal has a SD card, if the mobile terminal has a SD card:

acquiring the backup list from the differential upgrade package, reading an existing partition table from the mobile terminal memory, traversing the backup list and, if traversal is not completed, taking one item from the backup list, locating a corresponding partition in the existing partition table, checking a partition type, if the partition type is a partition of raw data type, adding cumulatively the partitions until the size is up to the total size of the backup data; if the partition type is a partition of filesystem type, adding cumulatively the total size of all files in the partition up to the total size of the backup data, and further traversing the partition type of the new version of software; and if traversal is completed:

checking a size of a remaining space of the SD card of the mobile terminal, if the size of the remaining space of the SD card is larger than a total size of backup data, saving the backup data to be backed up in the mobile terminal into the SD card according to the said backup list; and if the size of the remaining space of the SD card is larger than a total size of backup data, reporting an error, and ending.

11. The software upgrade method for a mobile terminal according to claim 7, further comprising:

acquiring the backup list from the differential upgrade package, reading an existing partition table from a mobile terminal memory, traversing the backup list, if traversal is not completed, taking one item from the backup list, locating a corresponding partition in the existing partition table, checking a partition type, if the partition type is a partition of raw data type, reading data from a whole partition, and saving associated data as one file on the SD card; if the partition type is a partition of filesystem type, packing files in the partition to one file in a TAR file format, and saving this file onto the SD card, and further traversing the backup list;

if traversal is completed, acquiring a new partition table from the differential upgrade package, re-partitioning the mobile terminal memory according to the new partition table, traversing the backup list, if traversal is not completed, taking one item from the backup list, locating a corresponding partition in the new partition table, checking the partition type, if the partition type is a partition of raw data type, writing the corresponding file that is backed up on the SD card into the partition; if the partition type is a partition of filesystem type, decompressing a corresponding TAR file that is backed up on the SD card, and writing all files in the TAR file into the partition, and further traversing the backup list.

12. The software upgrade method for a mobile terminal according to claim 7, further comprising:

decompressing the differential upgrade package to obtain a corresponding differentiating file and a differentiating file list, traversing the differentiating file list, if traversal is not completed, taking one item from the differentiating file list, generating corresponding new version files according to said differentiating file and the old version files in the mobile terminal, writing into the mobile terminal, and further traversing the backup list.

13. A software upgrade system for a mobile terminal, the system comprising:

a mobile terminal;

a computer processor on the mobile terminal, the computer processor configured to:

locate, according to a new version of software and an old version of software, partition tables of the new version of software and the old version of software, compare a difference between the new and old partition tables, and generate a corresponding backup list;

scan all files of the new version of software and generate a differential upgrade package that comprises the partition table of said new version of software and the backup list;

detect, according to the backup list in said differential upgrade package, a total size of backup data to be backed up in the mobile terminal, and compare said total size of the backup data with a remaining space of an SD card of the mobile terminal;

save the backup data to be backed up in the mobile terminal into the SD card according to said backup list, re-partition a mobile terminal memory according to said partition table of the new version of software in said differential upgrade package, detect a partition type, and correspondingly write the backup data on the SD card into the partition;

decompress said differential upgrade package to obtain a corresponding differentiating file, generate corresponding new version files according to said differentiating file and old version files in the mobile terminal, and write the new version files into the mobile terminal to complete the upgrade.

14. The software upgrade system for a mobile terminal according to claim 13, wherein the computer processor is further configured to:

acquire, according to the new version of software and the old version of software, partition tables of the new version of software and the old version of software;

traverse a partition table of the new version of software;

take one item from the new partition table, and check if a partition in an old partition table has a same name;

check if both new and old partitions have a same size and starting address; and check a partition type and adding a description item in the backup list to describe a name and type of said partition.

15. The software upgrade system for a mobile terminal according to claim 13, wherein the computer processor is further configured to:

check if the mobile terminal has a SD card;

acquire the backup list from the differential upgrade package, read the existing partition table from a mobile terminal memory, and traverse the backup list;

take one item from the backup list, locate a corresponding partition in an existing partition table, check a partition type, if the partition type is a partition of raw data type, add cumulatively the partitions until a size is up to a total size of backup data; if the partition type is a partition of filesystem type, add cumulatively the total size of all files in the partition up to the total size of the backup data; and check a size of the remaining space of the SD card of the mobile terminal, and compare the total size of the backup data with the remaining space of the SD card of the mobile terminal.

16. The software upgrade system for a mobile terminal according to claim 13, wherein the computer processor is further configured to:

acquire a backup list from a differential upgrade package, read an existing partition table from a mobile terminal memory, and traverse the backup list;

take one item from the backup list, locate a corresponding partition in an existing partition table, check a partition type, if the partition type is a partition of raw data type, read data from a whole partition, and save associated data as one file on the SD card; if the partition type is a partition of filesystem type, packing files in the partition to one file in a TAR file format, and save this file onto the SD card;

acquire a new partition table from the differential upgrade package, re-partition the mobile terminal memory according to the new partition table, and traverse the backup list; and take one item from the backup list, locate a corresponding partition in the new partition table, check the partition type, if the partition type is a partition of raw data type, write the corresponding file that is backed up on the SD card into the partition; if the partition type is a partition of filesystem type, decompress the corresponding TAR file that is backed up on the SD card, and write all files in the TAR file into the partition.

17. The software upgrade method for a mobile terminal according to claim 2, further comprising:

if a partition in the old partition table does not have the same name, traversing the partition table of the new version of software.

18. The software upgrade method for a mobile terminal according to claim 2, further comprising:

checking if both the new and the old partitions have a same size and starting address and, if the new and old partitions do not have the same size and starting address, checking the partition type, adding a description item in the backup list to describe the name and type of said partition, and traversing the partition table of the new version of software.

19. The software upgrade method for a mobile terminal according to claim 2, further comprising:

checking if both the new and the old partitions have a same size and starting address and, if the new and the old partitions have the same size and starting address, traversing the partition table of the new version of software.

20. The software upgrade method for a mobile terminal according to claim 8, further comprising:

checking if both the new and the old partitions have a same size and starting address and, if the new and the old partitions do not have the same size and starting address, checking the partition type, adding a description item in the backup list to describe the name and type of said partition, and traversing the partition table of the new version of software.

* * * * *